June 1, 1954           O. W. HOSKING          2,679,654
TIRE INFLATING AND SERVICING DEVICE
Filed Oct. 30, 1950
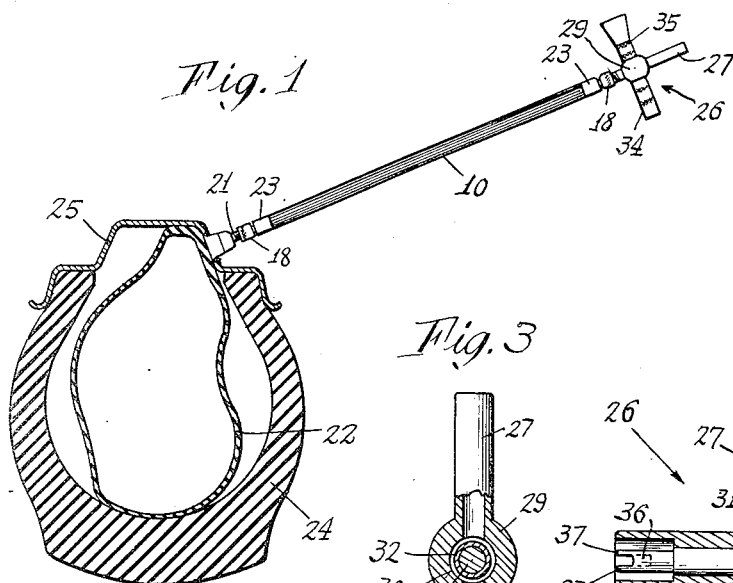
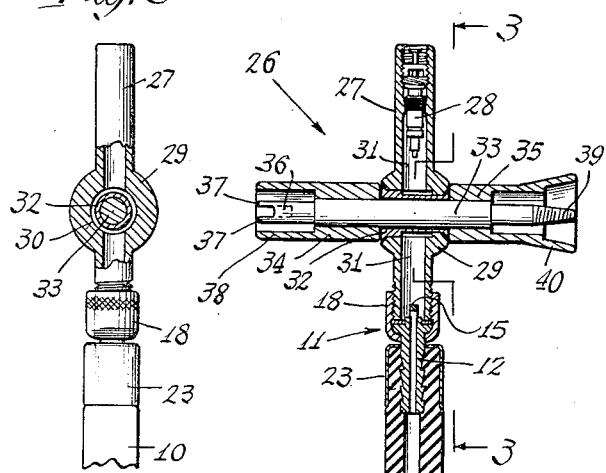
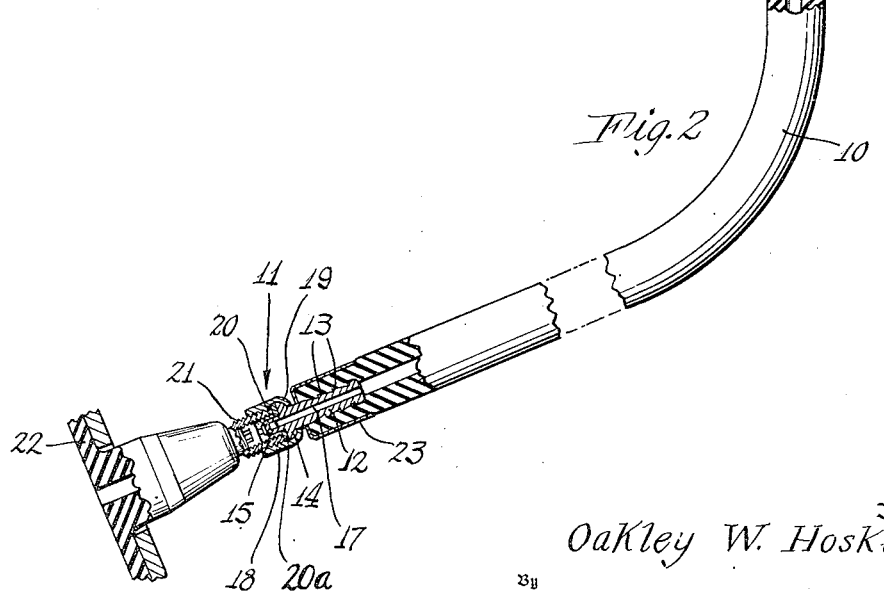
Inventor
Oakley W. Hosking
By Johnson and Kline
Attorneys Patented June 1, 1954

2,679,654

UNITED STATES PATENT OFFICE 2,679,654

TIRE INFLATING AND SERVICING DEVICE

Oakley W. Hosking, Monroe, N. Y., assignor to L. K. Hosking, Inc., Village of Monroe, N. Y., a corporation of New York Application October 30, 1950, Serial No. 192,842

7 Claims. (Cl. 7—1)

This invention relates to tire inflating and servicing equipment.

An object of the invention is to provide an improved tool of the type constituting, when in use, an extension of the valve stem of the inner tube in a tire, whereby the assembling of the tire and tube to the wheel and positioning of the valve stem through the wheel rim is greatly facilitated.

Another object of the invention is to provide an improved extension tool as above set forth, which will enable the tube to be quickly and easily inflated, deflated and again inflated so as to properly position and dispose the tube in the tire without folds or creases.

Still another object of the invention is to provide an improved combination handle and hose fitting for an extension tool of the above type, which is readily removable from the extension and useable with other similar extensions, or in servicing the valve.

In the past a valve stem extension tool has been provided to enable the valve stem to be drawn through the rim of the wheel and held in proper position for inflation of the inner tube. This prior tool, however, included at one end as an integral part an enlargement or handle which required that the extension be first inserted through the hole in the wheel rim prior to attaching it to the valve stem. Also, the extension was so constructed that it had to be removed in order to enable the tube to be deflated. These characteristics were undesirable in that they limited the usefulness and convenience of the tool and imposed additional motions or operations on the user. As an example, it is often desired to attach the extension to the tube without having to fit the extension through the wheel rim, and also desired to deflate the inner tube after initial inflation, in order to allow the tube to arrange itself properly within the tire without creases or folds. With the prior tool mentioned this could not be done, or done conveniently.

By the present invention I have overcome the disadvantages and objections to this prior valve stem extension tool. In accomplishing this, according to the invention, I provide an improved extension tool comprising a flexible hose part and a separate attachable and detachable handle part. The hose part has no integral or fixed enlargements or handle members which would prevent it from being passed entirely through the hole in the wheel rim. Accordingly it may be secured to the valve stem of the tube at any time found convenient, either before the tire and tube are brought near the wheel or after the tire and tube are partially assembled to the wheel. In the first instance the hose part may, if desired, be conveniently passed through the tire stem opening of the wheel after its attachment to the valve stem, and may then be used to properly position the stem and draw it through the said opening. In connection with this latter operation the user may if he desires attach the handle part to the hose part to provide a better grip for drawing the hose and valve stem through the opening in the wheel rim.

In accordance with my invention I provide a valve means in the handle part of the tool whereby the tube may be conveniently inflated after assembly of the tire to the wheel, and may then be easily deflated upon removal of the handle part from the hose without detaching the hose from the valve stem.

Thus where several tires are being worked on at one time the handle part of the tool may be used on the second tire, in conjunction with a second hose part at the same time that the first tube is being temporarily deflated after its initial inflation to properly position the tube. The handle part also has a novel arrangement of tool bits adapted to remove valve insides whether these are merely worn out or are sheared and unsuitable for removal by the usual two-prong bit.

A feature of the invention resides in the novel construction and arrangement of the handle part whereby the bits or tools are rotatably mounted on a shank extending through the air passage of the handle part without interfering with the flow of air or introducing leakage from the passage.

Other features and advantages will hereinafter appear.

In the accompanying drawings:

Figure 1 shows the improved tire inflating and servicing tool in elevation, attached to the valve stem of a tube mounted on a wheel rim together with an automobile tire, the latter parts being in section.

Fig. 2 is a side view of the tool, showing the end portions and handle part in axial section, the tool being attached to a valve stem; and Fig. 3 is a view partially in elevation and partially in section, taken on line 3—3 of Fig. 2.

As shown, the improved tire inflating and servicing tool comprises a flexible extension member or hose 10 which is preferably made of rubber, having identical fittings 11 secured to its ends or extremities. Each fitting 11 comprises a hollow shank 12 having external circular shoulders 13, the shank being pressed into the end of the hose 10 and retained therein by said shoulders. The shank 12 has an enlargement 14, preferably of hemispherical shape, beyond which an axial extension 15 projects, the said extension having a transverse opening in it, communicating with the bore 17 of the shank.

A circular knurled nut 18 is provided, having a turned-in flange 19 engaging the convex surface of the enlargement 14. The nut 18 has an internal shoulder 20 engaging a washer 20a interposed between the shoulder and the flat face of the enlargement 14. The nut 18 is rotatable on the shank 12 and is internally threaded to enable it to be screwed onto a valve stem 21 of an inner tube 22. Preferably a metal ferrule 23 is provided on each end of the hose 10 to compress the same around the shank 12 and securely anchor the latter in the tube.

In Fig. 1 the inner tube 22 is shown disposed within a tire 24 mounted on a wheel 25.

For attachment to the hose 10 there is provided, in accordance with the invention, a novel handle part 26 comprising a tubular metal member 27 having external threads at one end to enable it to be screwed into either of the nuts 18 of the extension or hose part. At its other end the member 27 has the usual internal threads and constriction of bore to accommodate a valve inside 28.

Intermediate its ends the member 27 has an enlargement 29 which is generally of spherical shape, and is provided with a transverse bore 30 communicating with the bore 31 of the member. A metal bushing 32 is disposed in the bore 30 of the enlargement 29, and has its ends laid-over to firmly secure it to the enlargement in air-tight relation. As shown in Figs. 2 and 3, a portion of the bushing 32 is of reduced diameter, fitting a reduced bore diameter of the enlargement 29 and providing clearance around the larger bore diameter of the enlargement whereby air may flow through the bore 31 of the member 27 around both sides of the bushing 32.

Rotatably carried by the bushing 32 is a shank 33, having knurled collars 34 and 35 press-fitted to it on opposite sides of the enlargement 29 and bushing 32.

One end of the shank 33 has a bore 36 and a pair of prongs 37 constituting a wrench for engagement with a valve inside to insert or remove the latter in a valve stem. The collar 34 has a skirt 38 surrounding the end of the shank 33 as shown.

At its other end the shank 33 has a tapered spike 39 having a left-hand thread, said spike being adapted to enter the opening of a valve inside whereby the same may be removed in the event that the wrench lugs or the plunger pin of the valve inside have been sheared off or deformed beyond the point of utility. The collar 35 has a flared skirt 40 surrounding the spike 39, and the said skirts and collars, together with the shank 33 constitute a convenient handle extending across the tubular member 27 to provide for convenient manipulation of the handle part 26 and of the extension or hose 10 when the equipment is being put to use.

The improved tire inflating and servicing tool of the present invention may be advantageously used in various ways. For example, the hose 10 may be detached from the handle part 26, and attached at one end to the valve stem of the tube after the latter has been inserted in a tire. Then the tire and tube may be fitted to a wheel after first passing the tube through the valve stem opening of the wheel. The tire and tube may then be assembled to the wheel, allowing the hose 10 to project through the valve stem opening whereby it may be used to draw the valve stem through the opening prior to inflation of the tube. The handle part 26 may then be attached to the hose 10, and an air hose applied to the handle part to inflate the tube.

Or, if desired, the tube 22 and tire 24 may be partially assembled on the wheel 25 and then the hose 10, after being assembled to the handle 26, may be passed through the valve stem opening and screwed onto the valve stem of the tube. Thereafter the tire and tube may be completely assembled or fitted on the wheel 25, using the hose 10 and handle 26 to draw the valve stem through the opening provided for it.

It will be understood that when the hose 10 has been applied to the valve stem 21 the extension or nib 15 will depress the plunger pin of the valve inside, opening the valve for the passage of air.

After partial inflation of the tube 22 the handle part 26 of the tool may be removed from the hose 10 and applied to another hose, to assemble another tire and tube on another wheel. The act of removing the handle part 26 allows the air to escape from the tube 22, deflating the tube and helping it to assume a proper position in the tire 24, free from folds or creases. Thereafter the handle part 26 may again be applied to the hose 10, and the tube 22 again finally inflated. The hose 10 is now removed from the valve stem 21 and the usual cap applied to the stem.

If for any reason the valve inside of a tube is found to be defective, it may be readily removed by applying the tool bit comprising the prongs 37 in the usual manner, and turning the collar 35. This may be done with the handle part 26 either assembled to the hose 10 or separated from the hose. In the event that the plunger pin or shoulders of the valve inside are sheared so that it will not turn in response to application of the wrench, the threaded spike 39 may be applied to the valve inside, and the collar 34 turned in a counterclockwise direction to effect removal of the valve inside.

Variations and modifications may be made within the scope of the claims and portions of the improvements may be used without others.

I claim:

1. A combination handle and air fitting for use with an extension tool for tire valve stems, comprising a tubular member having a valve in its bore adjacent one end and having coupling means on its other end for attaching it to the extension tool, said member having a transverse opening through it intermediate its ends; a handle comprising a shank passing through and rotatable in the transverse opening of the tubular member for carrying a tool bit on at least one of its ends; and means in said transverse opening, providing a bearing for said shank, said means preventing the escape of air from the bore of the member past the shank and having portions spaced from the walls of the opening to permit passage of air through the bore of the member.

2. A combination handle and air fitting for use with an extension tool for tire valve stems, comprising a tubular member having a valve in its bore adjacent one end and having coupling means on its other end for attaching it to the extension tool, said member having a transverse opening through it intermediate its ends; a handle comprising a shank passing through and rotatable in the transverse opening of the tubular member for carrying a tool bit on at least one of its ends; and a bushing in said transverse opening, providing a bearing for said shank, the ends of said bushing being laid over on the ends of the opening to prevent escape of air from the bore of the member, and said bushing having portions spaced from the walls of the opening to permit passage of air through the bore of the member.

3. The invention as defined in claim 2, in which the transverse opening has a reduced diameter at one end only, and in which the bushing has a similar reduced diameter at its corresponding end and also at its center portion, thereby to provide for the spacing of the said bushing portions from the walls of the opening.

4. A combination handle and air fitting for use with an extension tool for tire valve stems, comprising a tubular member having a valve in its bore adjacent one end and having coupling means on its other end for attaching it to the extension tool, said member having a transverse opening through it intermediate its ends; a handle comprising a shank for carrying tool bits, said shank passing through and being rotatable in the transverse opening of the tubular member, and having skirts at its ends to provide finger grips for turning the shank; and means in said transverse opening, providing a bearing for said shank, said means preventing the escape of air from the bore of the member past the shank and having portions spaced from the walls of the opening to permit passage of air through the bore of the member.

5. A tool to pull a tire valve through a valve stem opening in a wheel into projected position and to facilitate inflation of pneumatic tires and the like, comprising a length of flexible hose all portions of which have a cross-sectional size enabling it to fit through the valve-stem opening in the wheel rim; threaded couplings at both ends of said length of hose, each constructed for attachment individually to a threaded valve stem or similar threaded part to connect the hose thereto; means in each of said couplings, engageable with the plunger pin of a valve inside when the coupling is attached to the valve stem, to depress the pin and thereby open the valve for the passage of air therethrough; a tubular extension separable from said hose, having a handle and having at one end a threaded male part for insertion in one of said couplings; and a valve inside in the other end of said extension to prevent passage of air from the hose through said extension.

6. The invention as defined in claim 5, in which the extension has a transverse opening in it intermediate its ends, and a bushing disposed in said opening and sealed to the walls thereof, said bushing being smaller in diameter than the bore of the extension to enable air to pass through the bore past the bushing, and in which the handle comprises a shank passing through said bushing and rotatable therein, said shank being arranged to carry a tool bit on one end.

7. The invention as defined in claim 5, in which the handle comprises a shank extending laterally through the tubular extension and the bore thereof, said shank being rotatable in said extension and being arranged to carry a tool bit on at least one end, and in which there are means providing a bearing for said shank, said means preventing the escape of air from the bore of the extension past the shank.

References Cited in the file of this patent

UNITED STATES PATENTS

| Number | Name | Date |
|---|---|---|
| 1,297,239 | Potter | Mar. 11, 1919 |
| 1,308,219 | Brucker | July 1, 1919 |
| 1,435,904 | Kraft | Nov. 14, 1922 |
| 1,446,504 | Howell | Feb. 27, 1923 |
| 1,876,715 | Maynard | Sept. 13, 1932 |
| 1,882,455 | Spicer | Oct. 11, 1932 |
| 1,957,866 | Watson | May 8, 1934 |
| 2,124,836 | Teter | July 26, 1938 |
| 2,158,576 | Glassley | May 16, 1939 |
| 2,282,387 | Todd | May 12, 1942 |

FOREIGN PATENTS

| Number | Country | Date |
|---|---|---|
| 515,256 | France | Nov. 24, 1920 |